United States Patent

Satoh et al.

[11] Patent Number: 5,547,742
[45] Date of Patent: Aug. 20, 1996

[54] FUSER ROLL

[75] Inventors: Makoto Satoh; Takehide Okami; Noboru Shimamoto, all of Annaka, Japan

[73] Assignee: Shin-Etsu Chemical Co., Ltd., Tokyo, Japan

[21] Appl. No.: 266,854

[22] Filed: Jul. 5, 1994

[30] Foreign Application Priority Data

Jul. 5, 1993 [JP] Japan .................. 5-191719

[51] Int. Cl.$^6$ .......... B32B 15/06; C08L 27/12; C08L 83/04; C08L 83/08
[52] U.S. Cl. .......... 428/215; 428/332; 428/339; 428/421; 428/422; 428/447; 428/450; 428/451; 524/506; 525/102; 525/104; 528/15; 528/24; 528/31; 528/36; 492/53; 492/56; 355/285
[58] Field of Search .................. 428/421, 422, 428/446, 447, 450, 451, 461, 462, 425.8; 556/451, 476, 478, 485, 487, 488; 106/287.13, 287.14, 287.15, 287.16; 528/15, 24, 31, 32, 36, 42; 525/102, 104; 492/53, 56, 59

[56] References Cited

U.S. PATENT DOCUMENTS

| | | | |
|---|---|---|---|
| 4,272,179 | 6/1981 | Seanor | 355/3 FU |
| 4,430,406 | 2/1984 | Newkirk et al. | 430/99 |
| 4,465,805 | 8/1984 | Blizzard et al. | 524/765 |
| 4,585,848 | 4/1986 | Evans et al. | 528/15 |
| 4,604,424 | 8/1986 | Cole et al. | 524/862 |
| 4,904,726 | 2/1990 | Morgan et al. | 524/520 |
| 4,988,758 | 1/1991 | Fukuda et al. | 524/492 |
| 5,132,743 | 7/1992 | Bujese et al. | 355/274 |
| 5,326,611 | 7/1994 | Kishita et al. | 428/78 |
| 5,342,879 | 8/1994 | Takahashi et al. | 524/588 |
| 5,345,300 | 9/1994 | Uehara et al. | 355/285 |

Primary Examiner—Paul Thibodeau
Assistant Examiner—Vivian Chen
Attorney, Agent, or Firm—Cushman Darby & Cushman, LLP

[57] ABSTRACT

A fuser roll having a metal core shaft has a resilient layer placed around the metal core shaft with at least the surface layer of the resilient layer comprising a fluorosilicone rubber layer containing 5 to 50 wt. % polytetrafluoroethylene. Since this fuser roll is excellent in releasability and silicone oil resistance, the durability is excellent, and the image obtained by a copying machine wherein the roll is used becomes sharp.

13 Claims, No Drawings

FUSER ROLL

BACKGROUND OF THE INVENTION

1. Field of the Invention

The present invention relates to a fuser roll used, for example, as a fuser roll for reprography machines.

2. Description of the Prior Art

Hitherto, as a fusing system of dry copying machines, so-called hot press fusing by using a heated roll is most generally employed. Generally the surface layer of the fuser roll used in this hot press fusing is made of a fluororesin or a silicone rubber and in many cases the oil fuse method is used wherein a silicone oil is supplied onto the surface of the roll at all times so as to prevent an offset phenomenon that causes part of toner to be transferred to the surface of the roll. Since, out of such rolls, the silicone rubber fuser roll is conventionally made of a dimethylpolysiloxane or a methylvinylpolysiloxane as a major raw material, there are such problems that when a silicone oil is supplied onto the roll surface at all times, the silicone rubber forming the roll surface layer is swelled with the silicone oil to cause the strength to be lowered and to cause the size of the roll to be changed, which does not allow the nip width to be kept stably.

In order to improve the durability of fuser rolls, a roll of which silicone rubber surface layer is coated, for example, with a PTFE (polytetrafluoroethylene), an FEP (tetrafluoroethylene/hexafuloropropylene copolymer), an ETFE (tetrafluoroethylene/ethylene copolymer), a PFA (tetrafluoroethylene/perfluoroalkyl vinyl ether copolymer) is also developed (Japanese Patent Publication) (kokoku) No. 47-20747, but the surface is composed of a hard resin and therefore there is a defect that the copied image does not become sharp.

As a method of increasing the resistance of silicone rubbers to silicone oils, it is known to introduce as organic groups of the organopolysiloxane that is conventionally a major raw material of silicone rubbers, fluorine-containing groups, such as 3,3,3-trifluoropropyl groups. According to this method, it can be suppressed that the fluorosilicone rubber is swelled with a silicone oil and that the strength is lowered. However, since fluorosilicone rubbers are high in friction coefficient, the friction of the roll surface during the fusing run is high and therefore the roll surface is apt to be abraded and roughened. As a result, such problems arise that good copying becomes impossible and that offset is liable to occur because the releasability of the fuser roll from paper is poor.

SUMMARY OF THE INVENTION

Therefore, an object of the present invention is to provide a fuser roll excellent in silicone oil resistance and durability.

The present inventor has studied keenly to attain the above object and has found that the above object can be accomplished by the following constitution.

That is, according to the present invention, there is provided a fuser roll having a metal core shaft and a resilient layer placed around said metal shaft, at least the surface layer of said resilient layer comprising a fluorosilicone rubber layer containing 5 to 50 wt. % of a fluororesin.

The fuser roll of the present invention is excellent in releasability and silicone oil resistance and therefore is excellent in durability and the image obtained from copying machines in which that fuser roll is used becomes sharp.

DETAILED DESCRIPTION OF PREFERRED EMBODIMENTS

Now the present invention will be described in detail.

The resilient layer

At least the surface layer of the resilient layer of the fuser roll of the present invention comprises a fluorosilicone rubber containing 5 to 50 wt. %, preferably 20 to 40 wt. %, of a fluororesin. The thickness of the resilient layer is generally 0.5 to 20 mm and the thickness of the fluorosilicone rubber layer formed at least on the surface part is preferably at least 0.5 mm, more preferably 1 to 3 mm. If the fluorosilicone rubber layer is too thin, the image that will be obtained becomes unsharp, the strength of the rubber layer is not satisfactory, and therefore the rubber layer will be readily abraded, which is disadvantageous.

That is, the whole of the resilient layer placed around the metal shaft may be made of this fluorosilicone rubber or the inner layer part of the resilient layer situated near the metal shaft may be made of other resilient material and the outer layer part (at least the surface layer) of the resilient layer may be made of the fluorosilicone rubber.

In the latter, the resilient material used as the inner layer material includes, for example, a styrene/butadiene rubber, an ethylene/propylene rubber, a urethane rubber, and a silicone rubber. Out of these, the silicone rubber is preferable, and particularly dimethylsilicone rubbers, methylvinylsilicone rubbers, methylphenylsilicone rubbers and methylphenylvinylsilicone rubbers are more preferred, because of its good heat resistance.

The fluorosilicone rubber layer containing 5 to 50 wt. % of a fluororesin used in the present invention can be typically produced by curing a fluorosilicone rubber composition comprising (A) an organopolysiloxane, (B) a filler, (C) a fluororesin, and (D) a curing agent. Typical examples of components (A) to (D) are described below.

(A) The Organopolysiloxane

The organopolysiloxane (A) includes those represented, for example, by the following general formula (1):

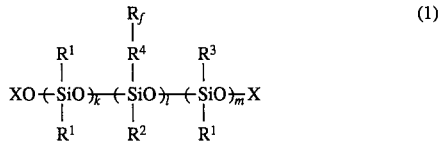

wherein $0.5 \leq l/(k+l+m) \leq 1$.

In the above formula, $R^1$ and $R^2$, which are the same or different, each represent an unsubstituted or substituted monovalent hydrocarbon group having no aliphatic unsaturated bonds. $R^1$ and $R^2$ preferably contain 1 to 8 carbon atoms and specific examples include an alkyl group, such as a methyl group, an ethyl group, an isopropyl group, and a butyl group, a cycloalkyl group, such as a cyclohexyl group and a cyclopentyl group, an aryl group, such as a phenyl group, a tolyl group, and a xylyl group, an aralkyl group, such as a benzyl group and a phenylethyl group, and a cyanohydrocarbon group, such as a 2-cyanoethyl group. Out of these, the methyl group, the ethyl group, and the phenyl group are particularly preferable.

$R^3$ represents a monovalent aliphatic unsaturated hydrocarbon group and a specific example includes an alkenyl group having 2 to 3 carbon atoms, such as a vinyl group, an allyl group, and an ethynyl group, with particular preference given to the vinyl group.

$R^4$ represents a single bond or a bivalent hydrocarbon group having no aliphatic unsaturated groups. The bivalent hydrocarbon group preferably contains 1 to 8 carbon atoms. Specific examples include the following:

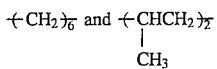

Rf represents a fluorine-containing organic group, a perfluoroalkyl group. Examples of this perfluoroalkyl group are those represented by the following formula:

wherein n is an integer of 1 to 10, and specific examples are $CF_3-$, $CF_3CF_2-$, and $C_8F_{17}-$. X represents a hydrogen atom or a group represented by the following general formula (2):

$$R^7-\underset{\underset{R^9}{|}}{\overset{\overset{R^8}{|}}{Si}}- \quad (2)$$

wherein $R^7$, $R^8$, and $R^9$, which are the same or different, each represent an unsubstituted or substituted monovalent hydrocarbon group. Examples of $R^7$ to $R^9$ include the hydrocarbon groups having no aliphatic unsaturated bonds exemplifying $R^1$ above and an alkenyl group, such as a vinyl group, an allyl group, and a hexenyl group. In the present invention, particularly preferably X represents a hydrogen atom or a group represented by the following formula:

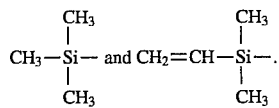

In the above general formula (1), k and m are each an integer of 0 or more, and l is an integer of 1 or more, preferably an integer of 50 to 50,000, provided that the organopolysiloxane of the general formula (1) contains in its molecule at least one silicon-bonded alkenyl group.

Further, if the amount of the fluorine-containing group is too small, the silicone oil resistance of the resilient roll is lowered and therefore l/(k+l+m) is 0.5 or more but 1 or below, preferably 0.75 or more but 1 or below.

The component (A), the organopolysiloxane, has preferably a viscosity in the range of 100 to 10,000,000 cSt at 25° C. and such organopolysiloxanes may be used singly or in combination of two or more of them.

(B) The Filler

As the filler, various fillers which have been used conventionally in silicone rubber compositions can be used. Examples include reinforcing fillers, such as fumed silica, precipitated silica, which silicas may have been rendered hydrophobic, carbon powder, titanium dioxide, aluminum oxide, quartz powder, talc, sericite, and bentonite, and fibrous fillers, such as asbestos, glass fiber, and organic fiber.

These fillers are preferably blended in an amount of 10 to 300 parts (by weight, the same being applied hereinafter), particularly 20 to 200 parts, per 100 parts the component (A). If the amount of the filler to be blended is less than 10 parts, a satisfactory reinforcing effect cannot be obtained, and if the amount of the filler to be blended is over 300 parts, there is a fear that the mechanical strength of the cured product is disadvantageously lowered.

(C) The Fluororesin

The fluororesin includes polytetrafluoroethylenes (PTFE), tetrafluoroethylene/hexafluoropropylene copolymers (FEP), tetrafluoroethylene/perfluoroalkyl vinyl ether copolymers (PFA), and ethylene/tetrafluoroethylene copolymers.

A low-molecular weight polytetrafluoroethylene (PTFE) having a molecular weight of 1,000 to 1,000,000 and a particle diameter of 1 to 10 μm is preferable because it can be readily blended and can lower the friction coefficient of the surface more effectively.

The content of the fluororesin in the fluorosilicone rubber composition is 5 to 50 wt. % and in particular the content is preferably 20 to 40 wt. % because in that case the friction coefficient of the surface can be reduced without lowering the mechanical strength of the obtained cured rubber itself.

(D) The Curing Agent

The curing agent includes, for example, an organic peroxide and an organohydrogenpolysiloxane having at least two silicon-bonded hydrogen atoms in the molecule.

As the organic peroxide, various organic peroxides having been conventionally used in organic peroxide curing can be used, and examples include benzoyl peroxide, 2,4-dichlrobenzoyl peroxide, 4-monochlorobenzoyl peroxide, dicumyl peroxide, tert-butyl perbezoate, tert-butyl peroxide, 2,5-dimethyl-2,5-bis(tert-butylperoxy)hexane, and cumyltert-butyl peroxide, which can be used singly or in combination of two or more of them. Preferably the amount of these organic peroxides to be blended is generally in the range of 0.2 to 5 parts per 100 parts of the component (A).

In the fluorosilicone rubber composition used in the present invention, the component (A), an organopolysiloxane, has aliphatic unsaturated groups and as a curing agent, the above-mentioned organohydrogenpolysiloxane can be used. That is, in this case, the addition reaction between the aliphatic unsaturated groups in the organopolysiloxane and the silicon-bonded hydrogen atoms in the organohydrogenpolysiloxane is responsible for the formation of a cured product. As that organohydrogenpolysiloxane, various organohydrogenpolysiloxanes conventionally used in silicone rubber compositions of an addition curing type can be used and in the present invention, particularly preferably use is made of an organohydrogenpolysiloxane represented by the following formula (3):

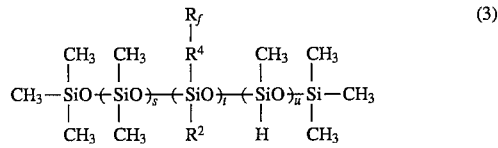

wherein $R^2$, $R^4$, and $R_f$ have the same meanings as defined above, s and t are each an integer of 0 or more, and u is an integer of 2 or more.

Preferably, the viscosity of these organohydrogenpolysiloxanes at 25° C. is generally 1,000 cSt or below.

Preferably the organohydrogenpolysiloxane is blended generally in such an amount that the number of the ≡SiH groups thereof is 0.5, particularly 1 to 5, per aliphatic unsaturated hydrocarbon group in the organopolysiloxane, the component (A).

Further, in the present invention, where, as the curing agent, an organohydrogenpolysiloxane is used, it is preferable to use as an addition reaction catalyst a platinum family metal catalyst additionally. The platinum family metal catalyst includes a platinum catalyst, a palladium catalyst, and a rhodium catalyst, with a platinum catalyst preferred. Specifically, examples of the platinum catalyst includes platinum black, chloroplatinic acid, a complex of chloroplatinic acid with an olefin, such as ethylene, an alcohol, an ether, an aldehyde, vinylsilane, or vinylsiloxane, or platinum powder supported on a carrier, such as alumina, silica, or asbestos.

Preferably, the amount of these platinum family metal catalysts to be blended is 1 to 500 ppm by weight, particularly 5 to 20 ppm by weight, in terms of the platinum family metal.

In the fluorosilicone rubber composition used in the present invention, various compounding additives can be added in the range wherein the object of the present invention for improving solvent resistance is not damaged. For example, a dispersant, such as diphenylsilanediol, a dimethylpolysiloxane which has a low degree of polymerization and of which molecular chain ends are blocked with hydroxyl groups, and hexamethyldisilazane, a heat resistance improver, such as ferrous oxide, ferric oxide, cerium oxide, and iron octylate, and a colorant, such as a pigment, can be blended as required.

To produce the fuser roll of the present invention, any particular method. is not required and any conventional method can be used. For example, the surface of a metal core shaft, for example, of aluminum, steel, or stainless steel that has been washed and degreased is coated with a primer to improve adhesion and is dried in air. If necessary, heating at 100° to 180° C. for about 5 to 30 min is carried out for baking. Thereafter, the above-described fluorosilicone rubber composition is molded, for example, by press molding, injection molding, or wrapped molding. Incidentally, it is possible that an under wrapping of a dimethyl type silicone rubber is formed initially and then the above-described fluorosilicone rubber containing 5 to 50 wt. % of a fluororein is applied thereon to form a two-layer structure. The succeeding steps can be steps that are conventionally carried out, such as postcuring and surface abrasion, thereby finishing the fuser roll.

EXAMPLES

Now the present invention will be described specifically by showing Examples and Comparative Examples, but the present invention is not limited to the Examples given below.

Example 1

100 parts by weight of a fluorosilicone rubber compound made up of 100 parts by weight of a fluorosilicone gum represented by the average structural formula (4):

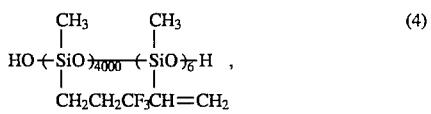

(4)

35 parts by weight of a fumed silica with a specific surface of 300 m²/g as a reinforcing agent, 5 parts by weight of a low-viscosity fluorosilicone oil represented by the following formula (5):

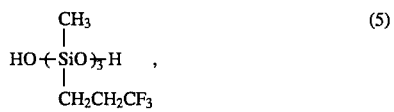

(5)

40 parts by weight of a polytetrafluoroethylene resin powder with an average particle diameter of 3 to 6 μm (available under the trade name of KTL-8N manufactured by Kitamura (KK)), and 0.7 part by weight of cerium oxide as a heat resistance improver was mixed with 0.7 part by weight of an organic peroxide, 2,5-dimethyl-2,5-di(tert-butylperoxy)hexane, as a curing agent, to obtain a fluorosilicone rubber composition I.

The composition I was heated and molded by press molding using a mold into a sheet with a thickness of 2 mm and the friction coefficient thereof was measured using a surface property measuring machine (type: HEIDON14 manufactured by HEIDON) under the conditions of a vertical load of 500 g and a speed of travel of 75 mm/min and was found to be 0.71.

Then, an aluminum core metal (having an outer diameter of 25 mm and a length of 350 mm) that would serve as a core of the intended roll was coated with a silicone primer (available under the trade name of No. 16 manufactured by Shin-Etsu Chemical Co., Ltd.). Then, onto the metal core, a mixture of 100 parts by weight of a methylvinylsilicone rubber compound (available under the trade name of KE-7010U manufactured by shin-Etsu chemical Co., Ltd.) and 0.5 part of an organic peroxide, 2,5-dimethyl-2,5-di(tert-butylperoxy)hexane, as a curing agent, was heated and molded by press curing by using a mold. Thereafter, the molded product was abraded by a polishing machine to form a silicone rubber resilient layer having an outer diameter of 45 mm. For bonding the silicone rubber layer, the lower layer, to the upper layer of the fluorosilicone rubber composition I which would be formed, a fluorosilicone adhesive (available under the trade name of X-65-412 manufactured by Shin-Etsu Chemical Co., Ltd.) was applied on the lower layer and was allowed to stand so that the adhesive might be dried in air by evaporation of the solvent. Onto the adhesive layer, the above fluorosilicone rubber composition was heated and molded by press molding by using a mold. Thereafter, the molded product was abraded by a polishing machine to bring the outer diameter to 50 mm, thereby obtaining the intended fluorosilicone rubber fuser roll. The outer diameter was measured by a laser measuring machine and was found to be 49.9 to 50.1 mm and the eccentricity was measured to be 0.1 mm or less. The eccentricity was measured in such a way that while the roll was supported on a bearing and was rotated to measure the outer diameter, the width of oscillation of the dial gauge of the laser measuring machine was read.

When the obtained roll was mounted as a pressure roll in a copying machine and was used for copying 2,000,000 pages, the abrasion was less and good copying was possible. After the copying of 2,000,000 pages, the roughness of the roll surface was measured by a universal surface configuration measuring machine (MODEL SE-3H manufactured by Kosaka-kenkyusho (KK)) and was found to be 15 μm or less.

Comparative Example 1

100 parts by weight of a fluorosilicone rubber compound made up of 100 parts by weight of a fluorosilicone gum (containing 0.15 mol % vinyl group) represented by the formula (4), 35 parts by weight of fumed silica as a reinforcing agent, 5 parts by weight of a low-viscosity fluorosilicone oil represented by the formula (5), and 0.7 part by weight of cerium oxide as a heat resistance improver was mixed with 0.7 part by weight of an organic peroxide, 2,5-dimethyl-2,5-di(ter-butylperoxy)hexane, as a curing agent, to obtain a fluorosilicone rubber composition II.

The above composition II was heated and molded by press molding by using a mold into a sheet end the friction coefficient was measured in the he same way as in Example described above and was found to be 0.95.

Then, a roll was produced in the same way is in Example, except that as the upper wrapping material the composition II was used. The obtained roll was used by mounting it as a pressure roll in a copying machine. When about 610,000 pages were copied, the roll surface was toughened and running of sheets of paper became impossible to continue good copying.

The roughness was measured in the same way as in . Example and was found to be 20 to 150 Nm.

Example 2

100 parts by weight of a fluorosilicone rubber compound made up of 100 parts by weight of a fluorosilicone gum represented by the average structural formula (6):

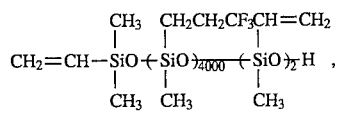

30 parts by weight of a fumed silica with a specific surface of 300 m$^2$/g as a reinforcing agent, 4 parts by weight of a low-viscosity fluorosilicone oil represented by the following formula (7):

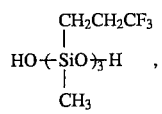

35 parts by weight of a polytetrafluoroethylene resin powder with an average particle diameter of 3 to 6 μm (available under the trade name of KTL-8N manufactured by Kitamura (KK)), and 0.7 part by weight of cerium oxide as a heat resistance improver was mixed with 0.7 part by weight of an organic peroxide, 2,5-dimethyl-2,5-di(tert-butylperoxy)hexane, as a curing agent, to obtain a fluorosilicone rubber composition III.

The composition III was heated and molded by press molding using a mold into a sheet with a thickness of 2 mm and the friction coefficient thereof was measured using a surface property measuring machine (type: HEIDON14 manufactured by HEIDON) under the conditions of a vertical load of 500 g and a speed of travel of 75 mm/min and was found to be 0.72.

Then, an aluminum core metal (having an outer diameter of 40 mm and a length of 350 mm) that would serve as a core of the intended roll was coated with a fluorosilicone adhesive (available under the trade name of No. X-65-412 manufactured by Shin-Etsu Chemical Co., Ltd.). Then, onto the metal core, the composition III was heated and molded by press molding by using a mold. Thereafter, the molded product was abraded by a polishing machine to bring the outer diameter to 50 mm, thereby obtaining the intended fluorosilicone rubber fuser roll. The outer diameter was measured by a laser measuring machine and was found to be 49.9 to 50.1 mm and the eccentricity was measured to be 0.1 mm or less. The eccentricity was measured in the same manner as in Example 1.

When the obtained roll was mounted as a pressure roll in a copying machine and was used for copying 2,000,000 pages, the abrasion was less and good copying was possible. After the copying of 2,000,000 pages, the roughness of the roll surface was measured by a universal surface configuration measuring machine (MODEL SE-3H manufactured by Kosaka-kenkyusho (KK)) and was found to be 13 μm or less.

Example 3

100 parts by weight of a fluorosilicone gum represented by the average structural formula (4), 35 parts by weight of a fumed silica with a specific surface of 300 m$^2$/g as a reinforcing agent, 35 parts by weight of a polytetrafluoroethylene resin powder with an average particle diameter of 3 to 6 μm (available under the trade name of KTL-8N manufactured by Kitamura (KK)), a curing agent having the formula (8):

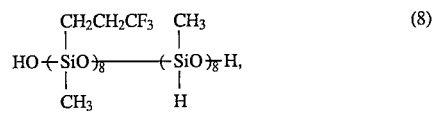

0.5 part by weight of 2% by weight chloroplatinic acid in an alcohol as a catalyst were mixed to obtain a fluorosilicone rubber composition IV.

The composition IV was heated and molded by press molding using a mold into a sheet with a thickness of 2 mm and the friction coefficient thereof was measured using a surface property measuring machine (type: HEIDON14 manufactured by HEIDON) under the conditions of a vertical load of 500 g and a speed of travel of 75 mm/min and was found to be 0.65.

Then, an aluminum core metal (having an outer diameter of 40 mm and a length of 350 mm) that would serve as a core of the intended roll was coated with a 5% by weight tetrabutyl titanate polymer solution in 4-methyl-2pentanone (available under the trade name of No. JBT-1000 (B-10) manufactured by Nippon Soda Co., Ltd.). Then, onto the metal core, the above fluorosilicone rubber composition IV was heated and molded by press molding by using a mold. Thereafter, the molded product was abraded by a polishing machine to bring the outer diameter to 50 mm, thereby obtaining the intended fluorosilicone rubber fuser roll. The outer diameter was measured by a laser measuring machine and was found to be 49.9 to 50.1 mm and the eccentricity was measured to be 0.1 mm or less. The eccentricity was measured in the same manner as in Example 1.

When the obtained roll was mounted as a pressure roll in a copying machine and was used for copying 2,000,000 pages, the abrasion was less and good copying was possible. After the copying of 2,000,000 pages, the roughness of the roll surface was measured by a universal surface configuration measuring machine (MODEL SE-3H manufactured by Kosaka-kenkyusho (KK)) and was found to be 13 μm or less.

Comparative Example 2

100 parts by weight of a silicone rubber compound made up of 100 parts by weight of a methylvinylsilicone gum represented by the average structural formula (9):

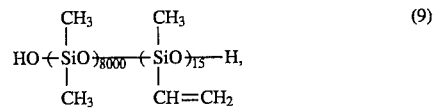

35 parts by weight of a fumed silica with a specific surface of 300 m$^2$/g as a reinforcing agent, 5 parts by weight of a low-viscosity silicone oil represented by the following formula (10):

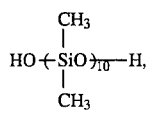

and 35 parts by weight of the polytetrafluoroethylene resin powder (KTL-8N) as used in Example 1 was mixed with 0.7 part by weight of an organic peroxide, 2,5-dimethyl-2,5-di(tert-butylperoxy)hexane, as a curing agent, to obtain a fluorosilicone rubber composition V.

Then, an aluminum core metal (having an outer diameter of 40 mm and a length of 350 mm) that would serve as a core of the intended roll was coated with a primer (available under the trade name of Primen 16T manufactured by Shin-Etsu Chemical Co., Ltd.). Then, onto the metal core, the composition V was heated and molded by press molding by using a mold. Thereafter, the molded product was abraded by a polishing machine to bring the outer diameter to 50 mm, thereby obtaining the intended methylvinylsilicone rubber fuser roll. The outer diameter was measured by a laser measuring machine and was found to be 49.9 to 50.1 mm and the eccentricity was measured to be 0.1 mm or less. The eccentricity was measured in the same manner as in Example 1.

When the obtained roll was mounted as a pressure roll in a copying machine and was used. At an initial stage where 100,000 pages had been copied, the surface of the roll was extremely deteriorated by the silicone oil, resulting that it became impossible for papers to travel.

Comparative Example 3

A composition VI was prepared in the same manner as in Example 1, except that an organopolysiloxane gum represented by the average structural formula (11):

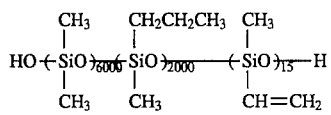

was used in place of the fluorosilicone gum of the average structural formula (4) and that the silicone oil of the formula (10) was used in place of the fluorosilicone oil of the formula (5).

Subsequently, a fuser roll was produced in the same manner as in Example 1, except that the composition VI was used in place of the composition I.

The fuser roll obtained was mounted in a copying machine and tested in the same manner as in Example 1. At the time when 450,000 pages had been copied, it became impossible for papers to travel because the fuser roll got swelled with the silicone oil.

What is claimed is:

1. A fuser roll having a metal core shaft and a resilient layer placed around said metal core shaft wherein at least the surface layer part of said resilient layer comprises a fluorosilicone rubber containing 20 to 40 wt. % of fluororesin; polytetrafluoroethylene; wherein fluorosilicone rubber is produced by curing a fluorosilicone rubber composition comprising (A) an organopolysiloxane; (B) a filler; (C) polytetrafluoroethylene; and (D) a curing agent; and wherein said organopolysiloxane (A) has the formula (1):

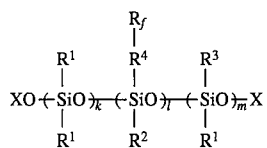

wherein $R^1$ and $R^2$, which may be the same or different, each represent a monovalent hydrocarbon group having no aliphatic unsaturated bonds and is selected from the group consisting of alkyl, cycloalkyl, aryl, aralkyl and cyanoalkyl, $R^3$ is a monovalent aliphatic unsaturated hydrocarbon group, $R^4$ represents a single bond or a bivalent hydrocarbon group having no atiphatic unsaturated groups, $R_f$ represents a fluorine-containing organic group, X represents a hydrogen atom or a group represented by the following general formula (2):

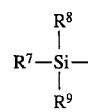

where $R^7$, $R^8$ and $R^9$ are each a monovalent hydrocarbon group, k and m are each an integer of zero or more, and 1 is an integer of one or more, provided that $0.5 \leq 1/(k+1+m) \leq$ one and wherein said organopolysiloxane (A) contains at least one silicon-bonded alkenyl group and has a viscosity at 25° C. in the range of 100 to 10,000,000 cSt.

2. A fuser roll as claimed in claim 1, wherein the thickness of said resilient layer is 0.5 to 20 mm and the thickness of said fluorosilicone rubber at at least the surface layer part of said resilient layer is at least 0.5 mm.

3. A fuser roll as claimed in claim 1, wherein said resilient layer consists essentially of said fluorosilicone rubber layer containing said fluororesin.

4. A fuser roll as claimed in claim 1, wherein the resilient layer further comprises an inner layer adjacent to said metal core shaft wherein the inner layer is selected from the group consisting of a styrene/butadiene rubber, an ethylene/propylene rubber, a urethane rubber, and a silicone rubber.

5. A fuser roll as claimed in claim 1, wherein said filler (B) comprises one selected from the group consisting of fumed silica, precipitated silica, carbon powder, titanium dioxide, aluminum oxide, quartz powder, talc, sericite, bentonite, asbestos, glass fiber, and organic fiber.

6. A fuser roll as claimed in claim 1 wherein said filler (B) is blended in an amount of 10 to 300 parts by weight per 100 parts by weight of said organopolysiloxane (A).

7. A fuser roll as claimed in claim 1, wherein said curing agent (D) is an organic peroxide.

8. A fuser roll as claimed in claim 7, wherein the amount of said organic peroxide is 0.2 to 5 parts per 100 parts by weight of the organopolysiloxane (A).

9. A fuser roll as claimed in claim 1, wherein said curing agent (D) is an organohydrogenpolysiloxane having at least two silicon-bonded hydrogen atoms in the molecule.

10. A fuser roll as claimed in claim 12, wherein said organohydrogenpolysiloxane is contained in an amount such that the number of the SiH groups contained therein is at least 0.5 per aliphatic unsaturated hydrocarbon group in the organopolysiloxane (A).

11. A fuser roll as claimed in claim 9, wherein said fluorosilicone rubber composition further comprises a catalyst selected from the group consisting of platinum, palladium and rhodium catalysts.

12. A fuser roll as claimed in claim 11, wherein said catalyst is present in an amount of 1 to 500 ppm by weight, based on the organopolysiloxane (A).

13. (Amended) A fuser roll as claimed in claim 1, wherein said curing agent (D) is an organohydrogenpolysiloxane represented by the formula (3):

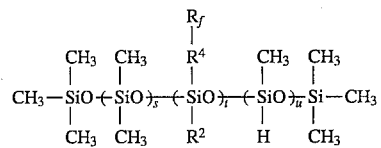

wherein $R^2$, $R^4$, and $R_f$ have the same meanings as defined in claim 1, s and t are each an integer of zero or more, and u is an integer of two or more.

* * * * *